E. T. SEATON.
HAY LOADER.
APPLICATION FILED OCT. 21, 1919.

1,350,887.

Patented Aug. 24, 1920.
2 SHEETS—SHEET 1.

Inventor
Elvin T. Seaton,
By
Attorney

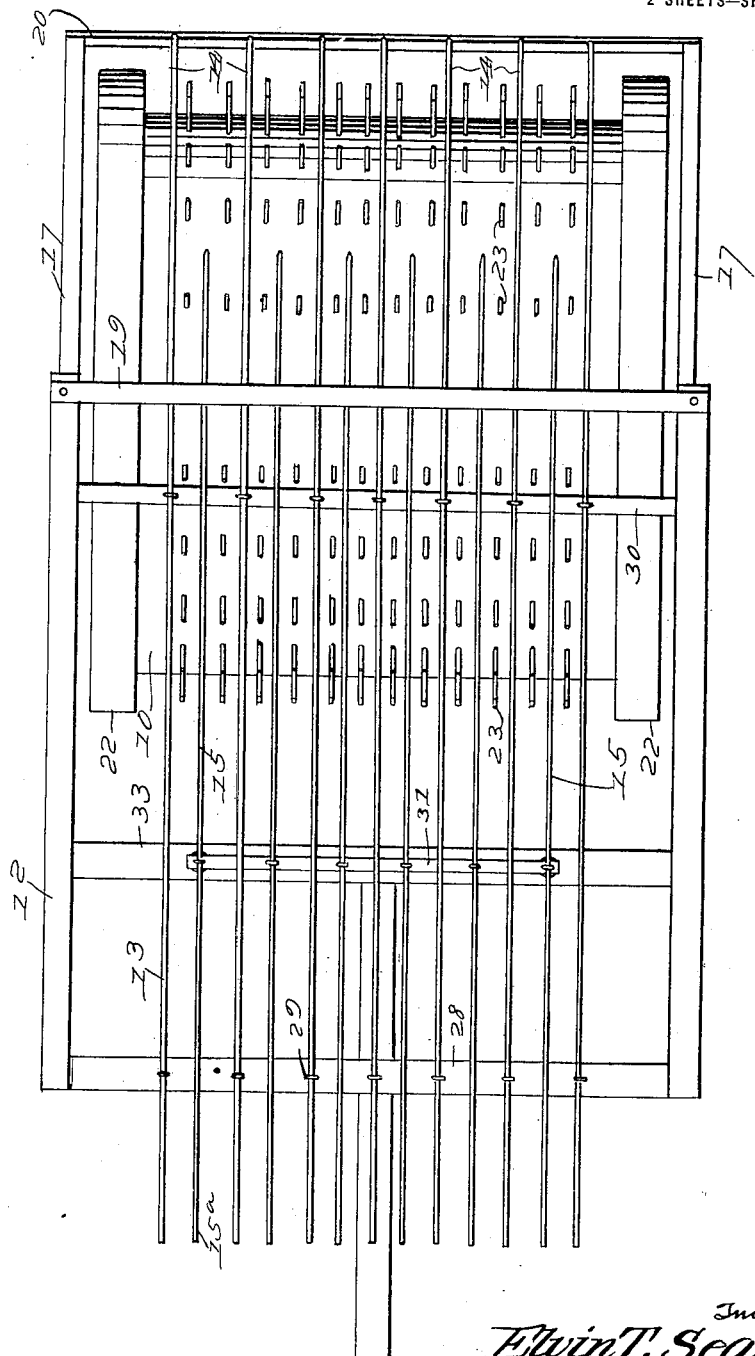

UNITED STATES PATENT OFFICE.

ELVIN T. SEATON, OF DANBURY, IOWA.

HAY-LOADER.

1,350,887.　　　Specification of Letters Patent.　　Patented Aug. 24, 1920.

Application filed October 21, 1919. Serial No. 332,260.

*To all whom it may concern:*

Be it known that ELVIN T. SEATON, a citizen of the United States of America, residing at Danbury, in the county of Woodbury and State of Iowa, has invented new and useful Improvements in Hay-Loaders, of which the following is a specification.

The object of the invention is to provide a comparatively simple and relatively inexpensive means for loading hay, grain and similar materials, minimizing the draft or power incident to such an operation, and insuring a substantially complete removal of the material from the ground and the effective deposit of the same in position to be carried; and to this end the invention consists in a construction and combination of parts of which a preferred embodiment is illustrated in the drawings, it being understood that changes in form and proportion may be resorted to within the scope of the claims without departing from the principles involved.

In the drawing:

Fig. 2 is a plan view of the same.

Figure 1:
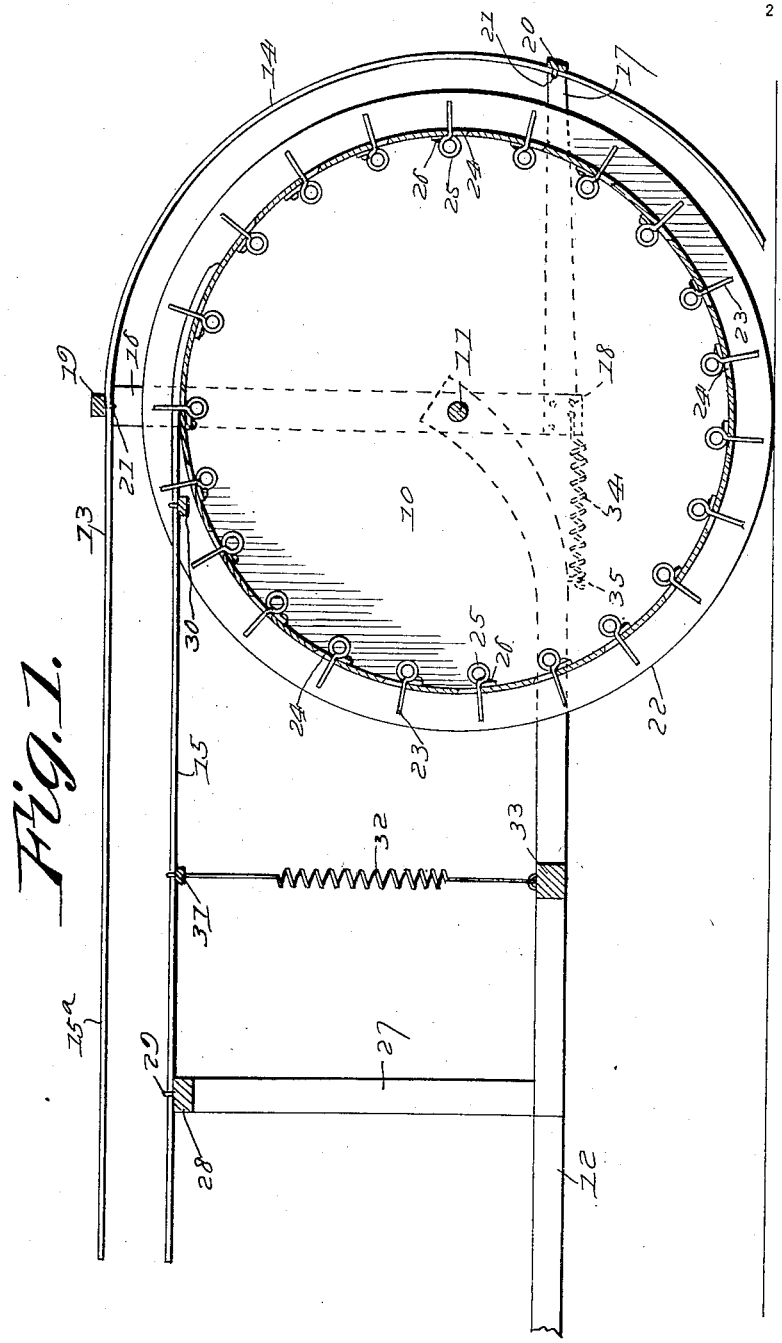
Figure 1 is a sectional view of a loader embodying the invention.

The apparatus consists essentially of a cylindrical drum 10 mounted upon a shaft 11 supporting the rear end of a draft tongue 12; a fork 13 having fingers 14 which are curved concentric with the drum and terminate close to the ground or surface traversed by the drum slightly in rear of the line of bearing of the drum upon the surface traversed, and stripper arms 15 consisting of rods which terminally and yieldingly bear upon the surface of the drum to receive the hay or other material which is raised by the drum between its surface and said fingers, to the end that said material may be conducted between the planes of said stripper arms and a windshield 15ª formed by forward extensions of the fork fingers lying in a plane substantially parallel with the stripper arms.

The fork which consists of parallel rods or heavy wires are supported in their proper relation to the wall of the drum by means of uprights 16 and rearwardly extending arms 17 connected at 18 to form angular brackets, said brackets being transversely connected at the upper ends of the standards by means of the cross bar 19 and at the rear ends of the arms 17 by means of a cross bar 20. The fork fingers are respectively secured to said cross bars 19 and 20 by means of staples, clips, or other fastening means indicated at 21.

The cylindrical wall of the drum terminates in tread rims 22 which are adapted to bear upon the surface of the ground to support the drum and are of a diameter in excess of the drum proper so as to give clearance for teeth 23 which project radially from the cylindrical wall of the drum through openings or slots 24 formed therein, said teeth being mounted for yielding movement and preferably being provided with supporting coils 25 arranged inside of the drum and secured to the wall thereof as shown at 26. The movement of these fingers through the space between the surface of the drum and the concentrically curved fingers of the fork serves to carry the hay or other material from the surface of the ground to the level of the passage formed between the wind-shield 15ª and the stripper arms 15.

The parallel rods forming the stripper arms are supported from the draft tongue 12 by means of a yoke 27 to the cross bar 28 of which said arms are attached by means of clips 29 or the equivalent thereof, and in advance of the rear extremities of said stripper arms which bear as above indicated upon the exterior surface of the cylindrical wall of the drum and slightly follow the curvature thereof as indicated in Fig. 1, said fingers are connected by a trip bar 30 disposed in the path of the yielding or spring teeth 23 of the drum so that as the drum rotates and the teeth thereof carry the hay or other material to the plane of the stripper arms, said teeth come successively into contact with the tripper bar 30 and are folded rearwardly in the openings formed in the wall of the drum, and are thus withdrawn from engagement with the hay or other material to leave the latter upon the surface formed by the stripper arms. Also at intermediate points between the supporting yoke 27 and the tripper bar 30 said stripper arms are connected by a cross bar or brace 31 to which is connected a spring 32 attached at its lower end to a cross bar 33 of the tongue frame, so that the rear extremities of said stripper arms are held in proper operative relation with the surface of the drum.

In order to yieldingly hold the fingers of the fork in proper relation to the surface of the ground while permitting a yielding movement thereof to avoid breakage or injury upon contact with a resistant obstacle, springs 34 are connected with the angles of the fork supporting brackets represented by the standards 16 and rearwardly extending arms 17, and are connected as at 35 to the tongue frame as indicated in Fig. 1.

Obviously as the hay having been disengaged by the teeth of the drum is moved forward between the planes of the stripper arms and the extensions of the fork fingers forming the barred wind-shield 15ᵃ, the lateral displacement thereof is prevented, and it may be removed from this passage and conveyed to any suitable point of deposit by any preferred mechanism which, however, forms no part of the present invention and therefore is not illustrated herein.

What is claimed is:

1. A hay loader having a cylindrical drum, a fork arranged with its fingers in concentric relation with the wall of the drum, rearwardly yielding teeth carried by the drum, stripper arms terminally arranged in position to engage the hay or other material carried by the drum, and a trip member arranged in the path of said teeth for successively repressing the latter to withdraw them from engagement with said material.

2. A hay loader having a cylindrical drum provided with rearwardly yieldable teeth, a fork having its fingers arranged in concentric relation with the drum, stripper fingers terminally arranged in bearing contact with the surface of the drum, yielding means for maintaining said stripper arms in their indicated positions, and a trip bar carried by the stripper arms in the path of said teeth of the drum.

3. A hay loader having a cylindrical drum provided with rearwardly yieldable teeth and bearing rims of a diameter to hold the extremities of said teeth out of contact with the ground, a fork having fingers disposed in concentric relation with the drum, yielding means for holding the fork fingers in their operative positions, stripper arms terminally disposed in yielding contact with the surface of the drum, and a trip bar arranged in the path of the teeth of the drum.

4. A hay loader having a cylindrical drum provided with rearwardly yieldable teeth, a fork having its fingers arranged in concentric relation with the drum and extended forward to provide a wind-shield, stripper arms arranged at an interval from said wind-shield to form a passage for conducting hay or other material from the drum and bearing terminally upon the surface of the drum for receiving said material therefrom, yielding means for maintaining the terminals of the stripper arms in contact with the drum, and a trip bar for repressing the fingers of the drum to disengage the same from said material.

5. A hay loader having a supporting frame, a cylindrical drum mounted upon said frame and provided with rearwardly yieldable teeth, brackets pivotally mounted upon the frame beyond the extremities of the drum and connected above and in rear of the same by cross bars, a fork having its fingers curved concentrically with the drum and secured to said cross bars, springs for holding said brackets yieldingly in their operative positions, stripper arms terminally bearing upon the surface of the drum, a wind-shield extending forwardly from the fork in a plane above and spaced from said stripper arms, yielding means for holding the stripper arms in terminal contact with the drum, and a trip bar connecting the stripper arms and arranged in the path of the fingers carried by said drum.

In testimony whereof he affixes his signature.

ELVIN T. SEATON.